P. RASMUSSEN.
TRANSVERSELY ADJUSTABLE CHUTE FOR CAKE STACKING MACHINES.
APPLICATION FILED AUG. 30, 1920.
1,397,657.
Patented Nov. 22, 1921.
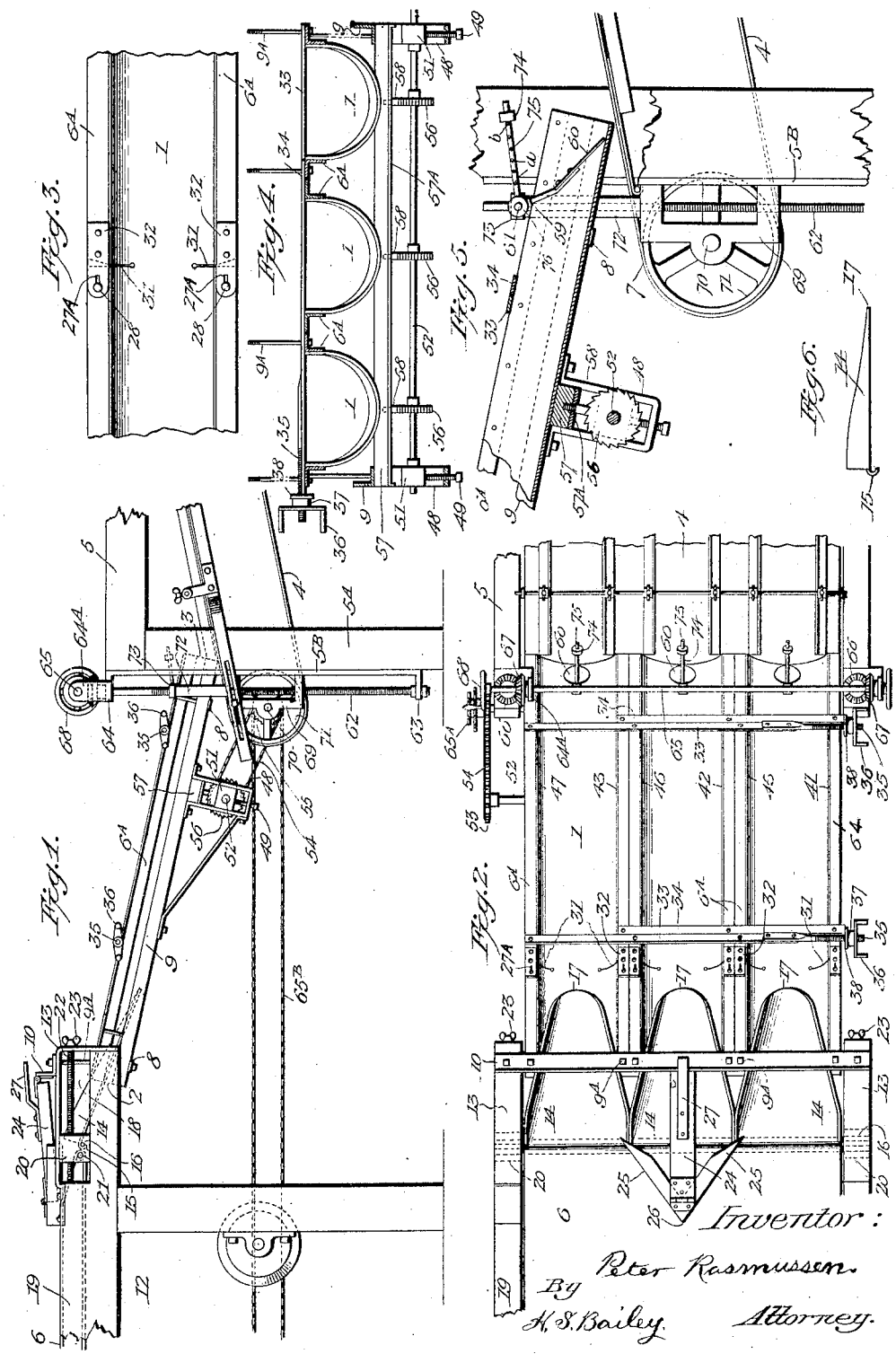

UNITED STATES PATENT OFFICE.

PETER RASMUSSEN, OF DENVER, COLORADO, ASSIGNOR OF ONE-HALF TO STEPHEN KNIGHT, OF DENVER, COLORADO.

TRANSVERSELY-ADJUSTABLE CHUTE FOR CAKE-STACKING MACHINES.

1,397,657.          Specification of Letters Patent.          Patented Nov. 22, 1921.

Application filed August 30, 1920. Serial No. 406,930.

*To all whom it may concern:*

Be it known that I, PETER RASMUSSEN, a citizen of the United States of America, residing at the city and county of Denver and State of Colorado, have invented new and useful Transversely-Adjustable Chutes for Cake-Stacking Machines, of which the following is a specification.

My invention relates to a multiple group of adjustable opening and closing cake stacking chutes, for cake stacking machines.

And the objects of my invention are:

To provide in connection with a cake stacking machine, a number of connected, transversely adjustable cake receiving chutes, provided with gravity means for checking and tripping the foremost cake in a line of cakes, whereby the succeeding cakes are caused to overlap in column formation in the chutes, the increasing pressure against said gravity means causing it to release the cakes, which thereafter pass continuously from the chutes to the cake stacking machine in overlapping column formation.

Second. To provide means for vertically agitating the cake stacking chutes so as to prevent the cakes from clogging in their passage through the chutes.

Third. To provide a simple group of chutes in which one or more of the chutes can be cut out when it is desired to use a less number, and to provide an adjustable and simple group of cake stacking chutes that can be opened or closed to receive cakes of different sizes in diameter and thickness.

I attain these objects by the mechanism illustrated in the accompanying drawings in which:

Figure 1 is a side elevation of the improved cake stacking chutes, showing their connection with the cake delivering and stack receiving units of a complete machine for handling cakes after they leave the oven.

Fig. 2 is a plan view of Fig. 1.

Fig. 3 is an enlarged plan view of a portion of one of the stacking chutes.

Fig. 4 is a transverse sectional view showing the chutes and means for imparting a vibratory movement to said chutes.

Fig. 5 is an enlarged sectional view through the lower end portion of one of the chutes, showing its connection with the stack receiving unit. And Fig. 6 is a side view of one of the guide chutes, which receive the cakes from the delivery conveyer and transfer them to the stacking chutes.

Similar letters of reference refer to similar parts throughout the several views.

Referring to the drawings:

The numeral 1 designates one of the individual adjustable cake stacking chutes of the group of chutes that comprise my present invention.

A somewhat similar chute can be seen in the patent issued to me Feb. 27, 1917, No. 1,217,345 for a cake stacking machine; my present invention, however, contains essential and valuable improvements over the construction shown in that patent.

My present invention contemplates a group of these chutes arranged side by side; three of these chutes are illustrated in my present application, but more can be used and should be used on wider machines that are built to stack a large output of cakes.

The chutes are connected at one end to the discharge end portion of the cake receiving part of the cake stacking machine illustrated in my above mentioned patent and in my pending application, Serial No. 406,928 filed August 30, 1920, for a new automatically operating cake receiving, separating, dividing and centralizing machine.

The chutes all stand in a downwardly inclined position from the cake receiving end 2, to their discharging end 3, where the cakes are discharged onto the lower end of an upwardly inclined endless belt 4, that is mounted on a supporting frame 5, from which they are picked up by an attendant and are placed in shipping boxes. Only a fragmentary part of this stacked cake receiving conveyer is illustrated herein, as it forms only a coöperating part of my present application, which concerns solely the adjustable chute portion of a complete cake stacking machine.

The stacked cake receiving portion of the complete machine was made the subject of a separate application for a patent, which was filed on August 30, 1920, Serial No. 406,929.

The function of these adjustable chutes is to receive the cakes as they are discharged from the belt 6, of the cake receiving, separating and dividing head-end part of a complete cake stacking machine, only a fragment, however, of the discharge end portion of which is illustrated herein.

The cakes are discharged from the belt 6, in a flat position and they fall into my chutes also in a flat position, but they are discharged from them in a flat overlapping stacked and close together packed condition onto the lower end 7, of the cake removing portion of the complete cake stacking machine, which I do not illustrate herein.

Each one of the three cake stacking chutes consists of a semi-circular shaped piece of sheet steel that is preferably about three feet long, and each chute rests on a strap 8, that extends across and supports its bottom edge, at its opposite ends, and the opposite ends of these straps are secured to angle-bars 9, which also extend lengthwise along the chutes, and the angle-bars 6$^A$, at the top edge of each chute, are bolted to the angle bars 9, of the chute supporting straps 8.

The upper end 2, of each of these adjustable chutes 1, that receives the cakes as they are discharged from the endless belt 6, are each secured by a bolt 9$^A$, to an angle bar 10, that extends across the lower end 11, of the frame 12, of the cake separating and dividing portion of the stacker, to the top part of the straps 13. As the cakes fall from the end of the discharging endless conveyer 6, they fall onto the top of three separate and independent guide plates 14, the upper ends of each of which are provided with a hook shaped end 15, that fits loosely over a rod 16. These guide plates taper from their upper ends to a rounded pointed portion 17, into the adjacent upper ends of the chutes and rest loosely on the bottom of their inside surfaces. This arrangement allows these guide plates to be removed easily and quickly from the discharging end of the belt 6, and from the cake entering ends of the chutes.

The opposite sides of the lower end 11, of the frame 12, are provided with slideways 18, that are formed on each side between the side boards 19, of the frame 12, and the straps 13. Boxes 20, are slidably mounted in these slideways and the shaft 21, that supports the discharging end of the belt 6, is journaled in these boxes, which are adjustable in the slideways by means of threaded rods 22, that are threaded through the boxes and extend through the ends of the straps 13, and are provided with finger grips 23, and are arranged to move the boxes to tighten or loosen the belt 6.

The rod 16, to which the upper ends of the guide plates 14, are hooked, extends through and is secured to these boxes 20.

The cakes as they drop off from the end of the belt 6, fall onto these guide plates and slide down them into the chutes.

I have illustrated three chutes and three guide plates leading into them; if, however, it is desired to guide the cakes as they discharge from the belt 6, into the two outside chutes and close the entrance and thus cut out the middle chute, I place a cake dividing mechanism, which consists of a hinge member 24, that is hinged at one end to the center of the angle bar 10, that extends across the end of the supporting frame 12, of the belt 6, and to this hinge member 24, I pivotally hinge a pair of fingers 25, connected to form a V-shaped guide or cake divider 26, the free ends of which extend to the adjacent edges of the two outside chutes, and when the member 24, is swung down, the V-shaped divider rests upon the conveyer belt 6, and divides the cakes into two streams that slide into the two outside chutes, the said V-shaped divider acting to close the entrance of the middle chute from the cakes.

When it is desired to use the middle chute the hinged member 24, with its divider is swung up on its pivotal hinge over its center and is supported in an inoperative position by a stop 27, which is secured to the member 24, and is adapted to engage the angle bar 10. Each cake stacking chute is provided with an adjustable contracting and expanding mechanism that is arranged to permit an operator to open or close the cross-section size or area of these chutes at their upper or lower end portions simultaneously and in a few seconds of time to adjust them to automatically stack any size of cakes that will enter the inlet end of the chutes.

This opening and closing mechanism comprises the following instrumentalities cooperating with features that form a part of the chutes, which are as follows:

The chutes are positioned with their side edges close together and at a short distance from the cake inlet ends of the chutes are each provided with slits 31, that extend from their opposite top side edges through their angle bar edge portions down into the body of the semi-circular shaped chutes a short distance, and to the upper top edges of each chute at its opposite sides and close to the slits 31, one end of a short flat thin strip of metal 32, which I term a hinge plate, is pivotally secured.

Each angle bar 6$^A$, is divided at a point in line with the slits 31, in the chutes, and the hinge plates 32, connect the adjoining ends of the divided angle bars, in the following manner: Each hinge plate has a slot 27$^A$, at one end, through which a bolt 28 passes, which also extends through the end portion of the upper member of the divided angle bar, and the lower end portion of the hinge plate is rigidly bolted to the lower member of the angle bar. By this means the two members of each angle bar are pivotally connected, and the lower members can be moved toward or away from each other, to contract or widen the chutes 1.

Below these hinge members 32, I place two independent bars 33 and 34, transversely across all of the chutes. The bar 33, is provided with a threaded stem portion 35, and is pinned or is otherwise secured to the far side of each chute, while the bar 34, is pinned or otherwise secured to the opposite side of each chute. Consequently these two bars are alternately secured to the opposite sides of each chute. The chutes naturally exert a resilient tension against being closed or contracted in width, and consequently have a tendency to spread apart or open out wider. And these cross-bars 33 and 34, are moved to open or close the top open sides of the chutes simultaneously, in the following manner:

The threaded stem 35, of the bar 33, extends beyond one of the outside chutes, and is threaded into and through a crank lever 36, that is provided with a hub portion 37, on the end of which a flange 38, is formed that is large enough in diameter to overlap the adjacent end of the cross bar 34, and thus hold each chute under expansive tension.

When the hand lever is turned onto the threaded stem, its flange engages the end of the bar 34, which projects slightly beyond the adjacent side of the chute, and this causes a pushing action on the said rod 34, and at the same time, a pulling action on the rod 33, which results in pushing inward the sides 41, 42 and 43, of the chutes, and at the same time pulling inward the opposite sides 45, 46 and 47, of the said chutes, by which they are contracted in width, and are held under tension, as the said chutes are made of sheet steel, and their opposite edges having a normal tendency to spring apart, or away from each other. When it is desired to expand or widen the chutes, the hand nuts 36, are turned in a reverse direction, thus relieving the pressure under which the chutes are held, and permitting them to expand or widen. By this means the chutes can be expanded or contracted in width to meet the requirements arising from the varying sizes of cakes which are passed over the machine.

It has been found in practice that some classes of goods do not slide down the chutes as readily as others, and in order to insure an uninterrupted passage of the goods from the receiving end to the discharge end of the chutes, the following means are employed to impart a vibratory movement to the chutes, and thus prevent stoppage of the goods passing through the same. To the under sides of the angle bars 9, and near the discharge ends of the chutes are secured depending yoke-shaped brackets 48, in which are slidably mounted bearing boxes 51, which rest upon adjusting bolts 49, which are threaded through the lower ends of the brackets, and by which the boxes can be raised or lowered, as will be understood.

A shaft 52, is mounted in these boxes, and one end of this shaft is provided with a sprocket wheel 53, which is connected by a chain 54, with a sprocket wheel 55, on a driven shaft 70, of the frame 5. Upon the shaft 52, are rigidly secured three ratchet wheels 56, which are preferably positioned centrally beneath the chutes. A bar 57, extends beneath and in engagement with the chutes, and at its ends are slidably mounted in the brackets 48. A metal strap 57$^A$, is secured to the underside of this bar, and in this strap are screwed three pins 58, the ends of which are beveled, and rest on the ratchet wheels 56. When the shaft 52, is rotated, the teeth of ratchet wheels 56, engage the pins 58, thus imparting an up and down, or vibratory motion to the bar 57, and to the chutes which rest upon the said bar, whereby goods passing through the chutes are kept moving until they are discharged upon the conveyer 4, of the next unit of the machine. It is necessary in order to the proper subsequent handling of the cakes by the attendants, that they pass out of the chutes in continuous columns, the cakes in each column overlapping one another; and this is accomplished by depending swinging arms 59, having stop plates 60, secured thereto, which lie at an inclination, their free ends resting upon the bottoms of the chutes near the discharge ends thereof. The arms 59, are supported in collars 76, which are mounted on a cross rod 61, the ends of which are supported in collars 73, which will be later described. Upon the forward uprights or legs 5$^A$, of the frame 5, are secured vertical straps 5$^B$, the lower and upper ends of which are bent at right angles, to form bearings 63 and 64, respectively, for upright threaded rods 62, upon which are mounted boxes 69, having bearings in which are journaled the ends of a shaft 70, upon which is mounted a drum 71, around which passes the conveyer 4. One end of the shaft 70, is provided with a sprocket wheel 65$^A$, which is connected by a chain 65$^B$, with a driven sprocket—not shown—on the frame 12, by which power is transmitted to the drum 71.

Sleeves 72, fit loosely over the rods 62, and rest upon the upper ends of the boxes 69, and the collars 73, which support the rod 61, also fit loosely on the rods 62, and rest upon the upper ends of the sleeves 72. The boxes are raised or lowered to change the inclination of the conveyer 4, as well as that of the chutes, and the raising and lowering of the boxes is accomplished as follows: The upper bearings 64, of the threaded rods 62, are provided with upright ears 64A, in which a shaft 65, is mounted having bevel pinions 67, secured thereon, which mesh with bevel gears 66, on the upper ends of the threaded rods 62. The shaft 65, is provided with an operating hand wheel 68, and when the shaft 65, is turned by said wheel, the pinions 67, turn the gears 66, and the rods 62, to which the said gears are secured, and as the rods 62, are threaded through the boxes 69, the said boxes are thereby raised or lowered to give the desired inclination to the conveyer 4, and to the chutes, the lower ends of which rest upon the said conveyer. The sleeves 72, are also raised and lowered by the boxes 69, on which they rest, and these sleeves impart a like movement to the collars 73, which support the rod 61, on which the stops 60, are mounted.

The collars 76, which support the stop arms 59, also support arms 75, which are arranged at a slight inclination to the horizontal, and are provided with holes $a$, to receive stop pins $b$, and upon the arms 75, are slidably mounted weights 74, which are held in place after proper adjustment on the arms, by the pins $b$, and which act to hold the stop plates 60, temporarily in engagement with the bottoms of the chutes, in order that the cakes first entering the chutes after the machine is started, may be stopped by the plates 60, to allow the cakes following to assume a column formation, and this is effected as follows:

When the advance cakes strike the stop plates, they are thereby tilted so that their rear edges are higher than their forward edges; and the cakes immediately following slide under the first cakes, and are also tilted, and this continues until the pressure of the cakes against the stops is sufficient to raise them, when the cakes will pass out of the chutes and onto the conveyer in overlapping column formation, and after the stop plates are lifted by the cakes, the said plates offer practically no resistance to the cakes as they pass, and after the cakes have once been given column formation, they continue in this form until the machine stops.

The weights 74, are adjusted to give the required resistance to the stops to meet the conditions arising from the different characters of cakes which are handled by the machine.

In operation, the chutes are expanded or contracted in the manner above described, to suit the character of cakes to be handled; the chutes are given the proper inclination, and the cakes are passed from the conveyer 6, of the frame 12, to the short guide chutes 14, and thence to the stacking shute 1, where the advance cakes are stopped to allow those following to assume column formation, after which they discharge from the chutes in continuous column formation upon the conveyer 4, and are carried forward by the said conveyer 4, in this formation, to be subsequently removed and placed in boxes by attendants. The conveyer 4, and parts connected therewith, form no part of the present invention, but are fully set forth in a separate application bearing the same date as the present application, and this latter conveyer forms the last unit of a complete cake stacking machine.

I do not wish to be limited to the construction and arrangement shown as changes can be made without departing from the spirit of my invention.

Having described my invention, what I claim as new and desire to secure by Letters Patent is:

1. An adjustable group of cake stacking chutes, each of which comprises a semi-circular shaped chute; means including cross-bars secured to opposite sides of said chutes in alternate order for adjustably opening or closing said chute to receive cakes of different sizes; and means including a gravity device for assembling said cakes in rows at the discharge end of each chute; said chutes being supported at a downward angle from their cake receiving end to their discharge end; and means including threaded rods for raising the discharge end of said chutes; and means including a rotating shaft under said chutes for agitating said chutes.

2. An adjustable group of cake stacking chutes, each of which comprises a semi-circular shaped chute; means including cross-bars secured to opposite sides of said chutes in alternate order for adjustably opening or closing said chute to receive cakes of different sizes; and means including a gravity device for assembling said cakes in rows at the discharge end of each chute; said chutes being supported at a downward angle from their cake receiving end to their discharge end; and means including threaded rods for raising the discharge end of said chutes; and means including a rotating shaft under said chutes for agitating said chutes; said shaft being provided with a ratchet wheel and a pin member on the bottom of said chutes in engagement with said ratchet teeth.

3. An adjustable group of cake stacking chutes, each of which comprises a semi-circular shaped chute, means including crossbars secured to opposite sides of said chutes in alternate order for adjustably opening or closing said chute to receive cakes of different sizes; and means including a gravity device for assembling said cakes in rows at the discharge end of each chute; said chutes being supported at a downward angle from their cake receiving end to their discharge end; and means including threaded rods for raising the discharge end of said chutes; and means including a rotating shaft under said chutes for agitating said chutes; said shaft being provided with a ratchet wheel and a pin member on the bottom of said chutes in engagement with said ratchet teeth; said chutes opening and closing means comprising also a transverse slot in the opposite top side edges of each of said chutes and a hinge connection between the parts of each chute separated by said slots.

4. An adjustable group of cake stacking chutes, each of which comprises a semi-circular shaped chute; means including cross-bars secured to opposite sides of said chutes in alternate order for adjustably opening or closing said chute to receive cakes of different sizes; and means including a gravity device for assembling said cakes in rows at the discharge end of each chute; said chutes being supported at a downward angle from their cake receiving end to their discharge end; and means including threaded rods for raising the discharge end of said chutes; and means including a rotating shaft under said chutes for agitating said chutes; said shaft being provided with a ratchet wheel and a pin member on the bottom of said chutes in engagement with said ratchet teeth; said chutes' opening and closing means comprising also a transverse slot in the opposite top side edges of each of said chutes and a hinge connection between the parts of each chute separated by said slots; and means including a hand lever threaded to one of said cross-bars and arranged to pull on one cross-bar and to push on the other cross-bar, whereby said group of chutes are opened or closed as desired.

5. An adjustable group of cake stacking chutes, each of which comprises a semi-circular shaped chute; means including cross-bars secured to opposite sides of said chutes in alternate order for adjustably opening or closing said chute to receive cakes of different sizes; and means including a gravity device for assembling said cakes in rows at the discharge end of each chute; said chutes being supported at a downward angle from their cake receiving end to their discharge end; and means including threaded rods for raising the discharge end of said chutes; and means including a rotating shaft under said chutes for agitating said chutes; said shaft being provided with a ratchet wheel and a pin member on the bottom of said chutes in engagement with said ratchet teeth; said chutes' opening and closing means comprising also a transverse slot in the opposite top side edges of each of said chutes and a hinge connection between the parts of each chute separated by said slots; and means including a hand lever threaded to one of said cross-bars and arranged to pull on one cross-bar and to push on the other cross-bar, whereby said group of chutes are opened or closed as desired; a frame for supporting said group of chutes, and a plate at the entering end of each chute arranged to guide said cakes into, and means including a hinged finger device for dividing the cakes and for closing the intermediate chute or chutes and for guiding the cakes into the outside chutes.

6. The combination with the discharging end of a cake receiving machine, of the group of three downwardly inclined cake stacking chutes, provided with the guide plates for receiving the cakes from the discharging end of said machine and guiding them into said chutes, with the cake dividing finger device for closing the entrance to the middle chute and directing them into the two outside chutes, and a suitable frame for supporting said chutes and their operating mechanism.

7. The combination with the discharging end of a cake receiving machine, of the group of three downwardly inclined cake stacking chutes, provided with the guide plates for receiving the cakes from the discharging end of said machine and guiding them into said chutes, with the cake dividing finger device for closing the entrance to the middle chute and directing them into the two outside chutes, and a suitable frame for supporting said chutes and their operating mechanism; the transverse slots in each chute, the hinge members connecting the ends of each chute, divided by said slots, and the cross-bars connected in alternate order to the opposite sides of each chute.

8. The combination with the discharging end of a cake receiving machine, of the group of three downwardly inclined cake stacking chutes, provided with the guide plates for receiving the cakes from the discharging end of said machine and guiding them into said chutes, with the cake dividing finger device for closing the entrance to the middle chute and directing them into the two outside chutes, and a suitable frame for supporting said chutes and their operating mechanism; the transverse slots in each chute, the hinge members connecting the ends of each chute, divided by said slots, and the cross-bars connected in alternate order to the opposite sides of each chute, one of said cross-bars being provided with a threaded stem, the hand lever threaded to said stem and arranged to engage the end of the other cross-bar, whereby when said hand lever is turned on said stem, said chutes are opened or closed as desired to receive stacked cakes of different sizes.

9. The combination with the discharging end of a cake receiving machine, of the group of three downwardly inclined cake stacking chutes, provided with the guide plates for receiving the cakes from the discharging end of said machine and guiding them into said chutes, with the cakes dividing finger device for closing the entrance to the middle chute and directing them into the two outside chutes, and a suitable frame for supporting said chutes and their operating mechanism; the transverse slots in each chute, the hinge members connecting the ends of each chute, divided by said slots, and the cross-bars connected in alternate order to the opposite sides of each chute, one of said cross-bars being provided with a threaded stem, the hand lever threaded to said stem and arranged to engage the end of the other cross-bar, whereby when said hand lever is turned on said stem, said chutes are opened or closed as desired to receive stacked cakes of different sizes; with the chute jarring and agitating mechanism, comprising the power rotated shaft below said chutes, the ratchet wheels, the cross-bars secured to the under side of said chutes and the pins depending therefrom and in engagement with said ratchet teeth.

10. The combination with the discharging end of a cake receiving machine, of the group of three downwardly inclined cake stacking chutes, provided with the guide plates for receiving the cakes from the discharging end of said machine and guiding them into said chutes, with the cake dividing finger device for closing the entrance to the middle chute and directing them into the two outside chutes, and a suitable frame for supporting said chutes and their operating mechanism; the transverse slots in each chute, the hinge members connecting the ends of each chute, divided by said slots, and the cross-bars connected in alternate order to the opposite sides of each chute, one of said cross-bars being provided with a threaded stem, the hand lever threaded to said stem and arranged to engage the end of the other cross-bar, whereby when said hand lever is turned on said stem, said chutes are opened or closed as desired to receive stacked cakes of different sizes; with the chute jarring and agitating mechanism, comprising the power rotated shaft below said chutes, the ratchet wheels, the cross-bars secured to the under side of said chutes and the pins depending therefrom and in engagement with said ratchet teeth; and with the mechanism for raising and lowering the lower ends of said chutes, comprising the threaded rods, the cross-rod supported thereby, the adjustable counterbalanced arms pivotally mounted on said cross-rod, tongues on said arms each of which depends into the discharge end of each chute.

11. The combination with the discharging end of a cake receiving machine, of the group of three downwardly inclined cake stacking chutes, provided with the guide plates for receiving the cakes from the discharging end of said machine and guiding them into said chutes, with the cake dividing finger device for closing the entrance to the middle chute and directing them into the two outside chutes, and a suitable frame for supporting said chutes and their operating mechanism; the transverse slots in each chute, the hinge members connecting the ends of each chute, divided by said slots, and the cross-bars connected in alternate order to the opposite sides of each chute, one of said cross-bars being provided with a threaded stem, the hand lever threaded to said stem and arranged to engage the end of the other cross-bar, whereby when said hand lever is turned on said stem, said chutes are opened or closed as desired to receive stacked cakes of different sizes; with the chute jarring and agitating mechanism, comprising the power rotated shaft below said chutes, the ratchet wheels, the cross-bars secured to the under side of said chutes and the pins depending therefrom and in engagement with said ratchet teeth, and with the mechanism for raising and lowering the lower ends of said chutes, comprising the threaded rods, the cross-rod supported thereby, the adjustable counterbalanced gravity slots, tongues on said cross-rod, one of each of which depends into the discharge end of each chute, and with the receiving end of a cake-row receiving and removing machine arranged to support the lower ends of said chutes and to receive the rows of cakes discharged by said gravity stop tongues from said chutes.

12. The combination of a group of adjustable cake stacking chutes, each of substantially semicircular form in cross-section, means including the hinged joints in each chute for opening and closing the same, and means including an adjustable weighted gravity stop tongue in the discharging end of each chute for collecting the stacked cakes in rows and discharging them in rows.

13. The combination of a group of adjustable cake stacking chutes, each of substantially semicircular form in cross-section, means including the hinged joints in each chute for opening and closing the same, and means including an adjustable weighted gravity stop tongue in the discharging end of each chute for collecting the stacked cakes in rows and discharging them in rows of a predetermined number of cakes from said chutes, and means including the agitating mechanism for agitating said chutes and the guide plates for guiding cakes into said chutes, and the dividing fingers arranged to close one or more chutes and to direct the cakes into the other chutes, as desired.

14. A plurality of stacking chutes arranged in parallel order, and comprising resilient sheet metal members, semicircular in cross section, a bar connecting the far edges of the several chutes and provided with a threaded end portion, a bar connecting the near edges of the several chutes, a hand nut on the threaded portion of the first mentioned bar, which engages the end of the second bar, whereby, when the hand nut is turned forward upon the threaded portion of the rod, the side edges of the chutes are simultaneously drawn inward, and when the hand nut is turned backward the sides of the chutes spring outward under resilient tension.

15. A plurality of stacking chutes arranged in parallel order and comprising resilient sheet metal members, semicircular in cross section, divided angle bars secured along the edges of said chutes, hinge members connecting the adjoining ends of the said divided angle bars, and being rigidly connected to one angle bar and pivotally connected to the adjoining end of the other angle bar, slits being formed in the side portions of said chutes in line with the divisions in said angle bars, spaced bars connecting the far angle bars of said chutes on one side of the said hinge connections, and having threaded end portions, bars connecting the near angle bars of said chutes and adjoining the first mentioned bars, hand nuts on the threaded end portions of said first bars, which are adapted to engage the ends of the second bars, whereby when the hand nuts are screwed forward the chutes are simultaneously contracted in width, and when the hand nuts are unscrewed the chutes expand in width under resilient tension.

16. The combination with cake delivery and stack receiving units, of a plurality of stacking chutes arranged in parallel order, and comprising resilient sheet metal members, semicircular in cross section, means for connecting the chutes at one end with the delivery unit, their opposite ends being adapted to discharge cakes in stack form, on the stack receiving unit, means for contracting the widths of the chutes simultaneously, said chutes being adapted to expand in width when the contracting force is relieved, and means for imparting a vibratory movement to said chutes.

In testimony whereof I affix my signature in presence of two witnesses.

PETER RASMUSSEN.

Witnesses:
G. Sargent Elliott,
Amy E. Nace.